United States Patent Office 3,417,059
Patented Dec. 17, 1968

---

3,417,059
1,3,5 - TRIS - [(Β - AZIRIDINYL)ACRYLYL] - HEXA-HYDRO-s-TRIAZINE AND PROCESS FOR MAKING; THE CURED CARBOXY - TERMINATED POLYMER AND PROCESS FOR MAKING
Joseph Adrian Hoffman, Bridgewater Township, Somerset County, N.J., assignor to American Cyanamid Company, Stamford, Conn., a corporation of Maine
No Drawing. Filed Oct. 11, 1965, Ser. No. 494,921
5 Claims. (Cl. 260—78.4)

---

ABSTRACT OF THE DISCLOSURE

A class of compounds represented by the formula:

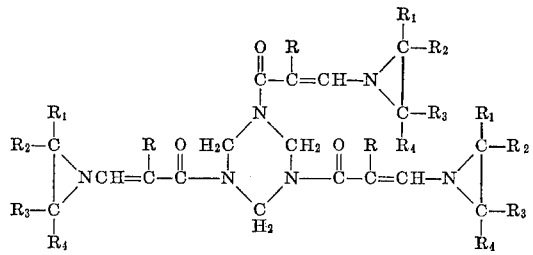

wherein R is either hydrogen, lower alkyl, fluorine, chlorine or bromine, and $R_1$, $R_2$, $R_3$ and $R_4$ are individually hydrogen or lower alkyl. These compounds are prepared by reacting one mole of a hexahydro-s-triazine of the formula:

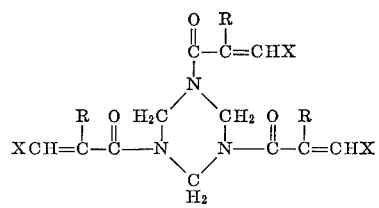

with three moles of an ethyleneimine of the formula:

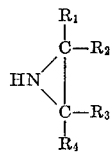

The products of this invention are useful as cross-linking agents in the preparation of plastics and resins, textiles, varnishes, paper and the like.

---

This invention relates to, and has as its object, the provision of a new class of compounds. More particularly, it relates to 1,3,5 - tris[(β - aziridinyl)acrylyl]hexahydro-s-triazines of the formula:

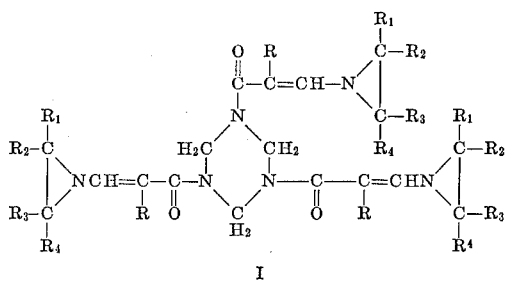

wherein R is hydrogen, lower alkyl or halogen such as fluorine, chlorine or bromine, and $R_1$, $R_2$, $R_3$ and $R_4$ are individually selected from the group consisting of hydrogen and lower alkyl. It also relates to the method of preparing the compounds of Formula I and to their use as cross-linking agents, particularly for the preparation of elastomers.

The compounds of this invention can be prepared by reacting one mole of a 1,3,5-tris(α,β-haloacrylyl)hexahydro-s-triazine or a 1,3,5-tris(β-haloacrylyl)hexahydro-s-triazine of Formula II with three moles of an ethyleneimine compound (i.e., an aziridine) of Formula III.

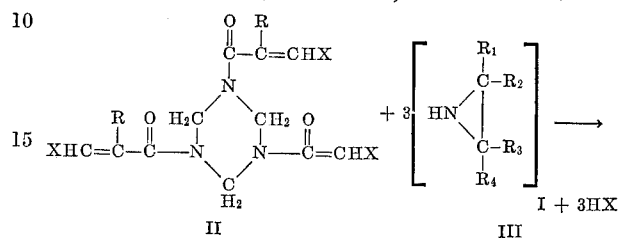

The R's in Formulae II and III have the same significance as in Formula I and the X in Formula II is a halogen, such as fluorine, chlorine or bromine.

The 1,3,5-tris(α,β-haloacrylyl)hexahydro-s-triazine or the 1,3,5-tris(β-haloacrylyl)hexahydro-s-triazine of Formula II can be prepared by reacting formaldehyde with a α,β-haloacrylonitrile or a β-haloacrylonitrile in the presence of concentrated sulfuric acid. For example, 1,3,5-tris(β-chloroacrylyl)hexahydro-s-triazine may be made by reacting β-chloroacrylonitrile with paraformaldehyde in the presence of concentrated sulfuric acid.

The ethyleneimines which may be used include ethyleneimine (or the alternate name, aziridine), 1,2-propyleneimine (or 2-methylaziridine), 1,2-butyleneimine (or 2-ethylaziridine), 2,3-butyleneimine (or 2,3-dimethylaziridine), 2-methyl-1,2-propyleneimine (or 2,2-dimethylaziridine), etc.

The reaction between the 1,3,5-tris(α,β-haloacrylyl)-hexahydro-s-triazine or the 1,3,5-tris(β-haloacrylyl)hexahydro-s-triazine and the ethyleneimine is carried out in the presence of an acid binding agent or alkali. A solvent medium may be present, but is not critical.

The solvent medium, where employed, may be benzene, hexane, toluene, chloroform, carbon tetrachloride, methylene dichloride, anhydrous methanol, isopropanol, etc.

The alkalies or acid binding agents include aliphatic tertiary amines, such as trimethylamine, triethylamine, tri-n-propylamine, etc., cyclic tertiary amines, such as pyridine, picoline, collidine, lutidine, etc., and alkali metal hydroxides and carbonates, such as sodium hydroxide, sodium carbonate, potassium hydroxide, potassium carbonate, etc. The alkali metal carbonates are the preferred acid binding agents.

Sufficient acid binder is used to combine with all the hydrogen halide formed during the reaction.

The initial reaction temperature should be below about 30° C., preferably between —10 and 20° C. External cooling will normally be required to maintain this temperature.

After the initial reaction, which occurs on mixing the ingredients, has subsided, the reaction temperature is gradually raised to a gentle reflux where a low-boiling solvent medium is present or to about 70° C. in the absence of such solvent, the reflux temperature being dictated by the boiling point of the low-boiling solvent present. The reaction mixture is maintained at reflux or 70° C. for about two hours, after which it is cooled.

As stated above, at least three moles of the ethyleneimine compound are required, but it is often advantageous to use an excess of ethyleneimine compound, such as a 100% excess. The unreacted imine can be recovered.

Addition of the 1,3,5-tris(α,β-haloacrylyl)hexahydro-s-triazine or the 1,3,5-tris(β-haloacrylyl)hexahydro-s-triazine to a mixture of the ethyleneimine compound and the acid acceptor is preferred. The reverse order of addition may also be used, but it is not as advantageous, since polymerization is sometimes encountered. Either or both of the reactants may be dissolved in the selected solvent.

The products may be isolated by any convenient method. For example, after filtration to remove insolubles, primarily halide salts of the acid binder, the filtrate is fractionally distilled to separate solvent, where employed, unreacted starting materials and product.

The compounds of this invention are normally stable, viscous liquids.

The products of this invention contain three aziridinyl groups and are reactive with monomeric and polymeric compounds having reactive hydrogens, including alcohols, phenols, mercaptans, thiophenols, carboxylic acids, amines, etc. They are thus useful as cross-linking agents in the preparation of plastics and resins, textiles, varnishes, paper, etc. For example, they are effective curing agents for vulcanizable rubbery materials which serve as binders in solid rocket propellant compositions. Rubbery materials include homopolymers of conjugated dienes and copolymers of conjugated dienes with materials copolymerizable therewith, as shown in U.S. Patent No. 3,087,843. Of particular interest is their use in propellant compositions comprising an inorganic oxidizing salt and either a synthetic acid-terminated polymeric binder or a synthetic copolymer of a conjugated diene and an unsaturated carboxylic acid (see U.S. Patent No. 3,087,844). The first type of polymer may be exemplified by the formula:

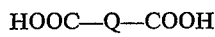

wherein Q is a polymer chain, as for example, a polymer of a conjugated diene such as 1,3-butadiene. The second type of polymer may be exemplified by a copolymer of 1,3-butadiene and acrylic acid. Utility in this capacity is surprising, since many known polyaziridinyl compounds are unstable and undergo polymerization on standing, whereas the present compounds, for the most part, are stable at room temperature for extended periods of time.

In addition to the three aziridinyl groups, the compounds of the present invention also contain three unsaturated sites on each of the side chains. Such content is an additional advantage in cross-linking agents of this type in that if additional rigidity is desired in the cross-linked elastomer, said unsaturated sites can be utilized for further cross-linking to obtain the desired rigidity. Such additional cross-linking capabilities generally is unavailable in other known cross-linking agents.

In the following examples, the parts and percentages are by weight.

EXAMPLE 1

1,3,5-tris[(2-methylaziridinyl)acrylyl]hexahydro-s-triazine

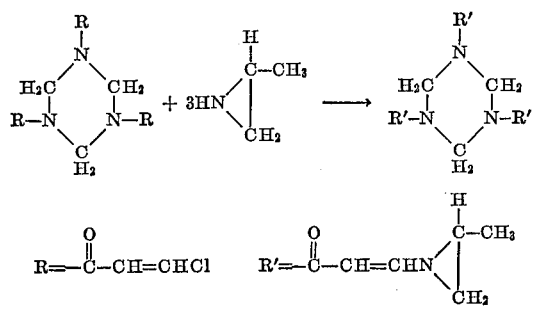

Into a suitable reactor was placed 5.0 parts (0.014 mole) of 1,3,5-tris(β-chloroacrylyl)hexahydro-s-triazine, 4.8 parts (0.084 mole) of propyleneimine, 11.6 parts (0.084 mole) of potassium carbonate (anhydrous) and 40 parts of isopropanol. The mixture was cooled at the start to −10 to 0° C. and then maintained at 0 to 5° C. for about three hours. It was then warmed to gentle reflux and refluxed for two hours. The mixture was then cooled, filtered and allowed to stand for 48 hours. The alcohol and excess propyleneimine were then stripped off employing a rotary-type vacuum evaporator. A viscous pale yellow oil was obtained.

The corresponding hexahydro-s-triazines and ethylene imines mentioned hereinbefore react in a completely analogous manner to produce similar trisaziridinylacrylylhexahydro-s-triazines.

EXAMPLE 2

The product of Example 1, 1.8 parts, was mixed with 20 parts of an acid-terminated polymer of 1,3-butadiene. The mixture was placed in an oven at 50° C. In 6.5 hours, the mixture had cured to a non-tacky elastomer.

The elastomer was examined more closely and appeared to have better strength characteristics than similar elastomers obtained with other trifunctional aziridinyl compounds.

I claim:
1. Compounds of the formula:

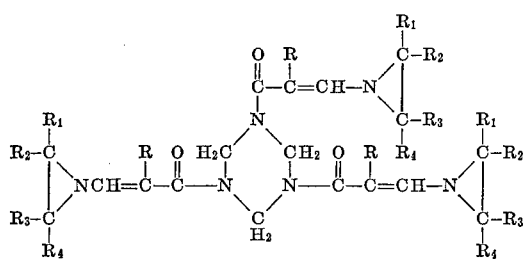

wherein R is either hydrogen, lower alkyl, fluorine, chlorine or bromine, and $R_1$, $R_2$, $R_3$ and $R_4$ are individually hydrogen or lower alkyl.

2. 1,3,5 - tris[(2-methylaziridinyl)acrylyl]hexahydro-s-triazine.

3. Process for preparing compounds of claim 1 which comprises reacting one mole of hexahydro-s-triazine of the formula:

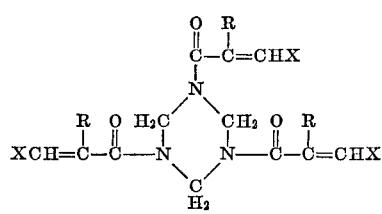

wherein R is hydrogen, lower alkyl or X, and X is chlorine, fluorine or bromine with three moles of an ethyleneimine of the formula:

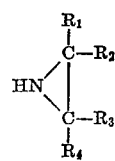

wherein the R's are hydrogen or lower alkyl at a temperature between −10° C. and 70° C. in the presence of an acid binding agent or an alkali in an amount sufficient to combine with hydrogen halide formed during reaction.

4. In the process of producing a cross-linked elastomer from carboxy-terminated 1,3-butadiene polymers, the improvement which comprises using a compound of claim 1 as the cross-linking agent.

5. The cross-linked elastomer obtained from the process of claim 4.

References Cited

UNITED STATES PATENTS 3,074,917 1/1963 Reynolds _____ 260—85.1
3,197,463 7/1965 Tesoro et al. _____ 260—239

JOSEPH L. SCHOFER, *Primary Examiner.*

C. A. HENDERSON, *Assistant Examiner.*

U.S. Cl. X.R.

260—94.7, 249.6, 2, 82.1; 149—19